United States Patent
Kaufmann

(10) Patent No.: US 10,343,129 B2
(45) Date of Patent: Jul. 9, 2019

(54) PRODUCT CONTAINER FOR A FLUIDIZED BED INSTALLATION AND FLUIDIZED BED INSTALLATION

(71) Applicant: Robert Bosch GmbH, Stuttgart (DE)

(72) Inventor: Harald Kaufmann, Wollbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/758,533

(22) PCT Filed: Jul. 12, 2016

(86) PCT No.: PCT/EP2016/066490
§ 371 (c)(1),
(2) Date: Mar. 8, 2018

(87) PCT Pub. No.: WO2017/041931
PCT Pub. Date: Mar. 16, 2017

(65) Prior Publication Data
US 2018/0272305 A1    Sep. 27, 2018

(30) Foreign Application Priority Data

Sep. 8, 2015 (DE) .......................... 10 2015 217 122

(51) Int. Cl.
*B01J 2/16* (2006.01)
*B01J 8/18* (2006.01)
(Continued)

(52) U.S. Cl.
CPC . *B01J 8/34* (2013.01); *B01J 2/16* (2013.01); *B01J 8/1818* (2013.01); *B01J 8/1872* (2013.01);
(Continued)

(58) Field of Classification Search
CPC ......... B01J 2/00; B01J 2/16; B01J 8/00; B01J 8/18; B01J 8/1818; B01J 8/1872;
(Continued)

(56) References Cited

U.S. PATENT DOCUMENTS 7,727,484 B2 * 6/2010 Hansen ................. B01J 2/16
118/716
2003/0070318 A1   4/2003 Werner et al.
2008/0107570 A1   5/2008 Hansen et al.

FOREIGN PATENT DOCUMENTS

WO      2011031244      3/2011

OTHER PUBLICATIONS

International Search Report for Application PCT/EP2016/066490 dated Oct. 14, 2016 (English Translation, 2 pages).

* cited by examiner

*Primary Examiner* — Natasha E Young
(74) *Attorney, Agent, or Firm* — Michael Best & Friedrich LLP

(57) ABSTRACT

The present invention relates to a product container for a fluidized bed installation (1) having a product container wall (12), a product container bottom (13), a product container opening (14) opposite the product container bottom (13), a distributor bottom (20) between the product container bottom (13) and the product container opening (14), and at least one volume-reducing element (40) which can be releasably attached to the distributor bottom (20), on that side (20-1) of the distributor bottom (20) oriented toward the product container opening (14), and by means of which the free volume of the product container (10) between the distributor bottom (20) and the product container opening (14) is reduced.

20 Claims, 8 Drawing Sheets

(51) Int. Cl.
    *B01J 8/34*         (2006.01)
    *B01J 8/44*         (2006.01)
    *B01J 19/24*       (2006.01)

(52) U.S. Cl.
    CPC ........ *B01J 8/44* (2013.01); *B01J 2208/00884* (2013.01)

(58) Field of Classification Search
    CPC ......... B01J 8/24; B01J 8/34; B01J 8/44; B01J 19/00; B01J 19/24; B01J 2208/00796; B01J 2208/00884
    See application file for complete search history.

PRODUCT CONTAINER FOR A FLUIDIZED BED INSTALLATION AND FLUIDIZED BED INSTALLATION

CROSS-REFERENCE TO RELATED APPLICATIONS

This application is a national stage application claiming priority to PCT/EP2016/066490, published as WO 2017/041931, and filed on Jul. 12, 2016, which claims priority to German Patent Application Serial No. DE 10 2015 217 122, filed on Sep. 8, 2015.

BACKGROUND OF THE INVENTION

The present invention relates to a product container for a fluidized bed installation and a fluidized bed installation, which comprises the product container.

Fluidized bed installations are frequently used in the chemical process technology and in particular during the production of pharmaceutical products in order, for example, to further process a starting material in the form of a bulk material. The further processing can, for example, consist of a thermal and/or material based treatment.

To this end, a fluidized bed installation has a product container provided in a lower region and a process container arranged above said product container. During operation, these are connected to one another to form a continuous fluidized bed container. A distributor bottom is provided in the lower region of the product container. The distributor bottom has openings or apertures, by means of which a gas stream can be introduced from below into the overlying chamber. The fluidized bed is formed by means of the interaction between the gas which was introduced and the components of the bulk material, wherein the fluidized bed can assume a liquid-like state.

The problem with such fluidized bed installations is that product containers and process containers are configured to a certain product quantity. That means that the installation is fixedly configured depending on the product quantity to be achieved. In order to increase the flexibility of the installation, differently sized product containers can alternatively be kept available. This has an increased investment volume for the fluidized bed installation and increased operating costs as a result.

SUMMARY OF THE INVENTION

The product container according to the invention has in contrast the advantage that, at a fixed base volume of the product container, the effective or operative volume for forming the product to the respective requirements with respect to the product quantity to be achieved can be adapted so that different product volumes are treatable and producible with a single product container. As a result, the number of individual product containers having different volumes to be kept available is reduced and the installation as such can be used more flexibly. According to the invention, this is achieved by virtue of the fact that a product container for a fluidized bed installation is provided having a product container wall, a product container bottom, a product container opening opposite the product container bottom, a distributor bottom between the product container bottom and the product container opening and at least one volume-reducing element which can be releasably attached to the distributor bottom on that side of the distributor bottom oriented toward the product container opening and by means of which the free volume of the product container between the distributor bottom and the product container opening is reduced. The provision of at least one volume-reducing element on the distributor bottom on that side of the distributor bottom oriented toward the product container opening reduces the effective volume available in the product container so that at least two different product volumes can be treated or produced with one and the same product container by means of mounting and dismounting the volume-reducing element.

The use of the product container according to the invention can be further more flexibly configured via a plurality of different volume-reducing elements.

In a preferred embodiment of the product container according to the invention, the volume-reducing element has a bottom region and a casing. The bottom region of the volume-reducing element can advantageously be releasably attached to or on the distributor bottom. The casing has the effect during operation of the product container according to the invention, in particular then if said casing is not concave and further is preferably convex, that no product components rest on or remain long on the volume-reducing element. All of the product components in the product container slide down from the convex casing of the volume-reducing element and fall back into the region of the bed installation and/or the distributor bottom. As a result, dead spaces are prevented or at least reduced. By providing a bottom region at the volume-reducing element, the possibility arises for a particularly simple and reliable mounting of the volume-reducing element at or on the distributor body.

Volume-reducing elements can be simply produced for the product container according to the invention if the volume-reducing element is conical and in particular has the shape of a vertical, circular cone. By providing a plurality of volume-reducing elements, said elements can particularly be designed so as to be similar in shape to one another; thus enabling them to be stacked or nested in one another during storage. In so doing, said elements take up less space in the entirety thereof. The similarity of shape also facilitates the nesting of a plurality of volume-reducing elements during operation.

According to a further preferred embodiment of the volume container according to the invention, measures are taken to fluid-mechanically decouple the volume enclosed by the volume-reducing element itself from the effective volume of the product container above the distributor bottom. This particularly succeeds by virtue of the fact that the volume-reducing element has a circumferential seal in the transition between casing and bottom region, with which seal the volume-reducing element can be disposed on the distributor bottom.

The seal of the volume-reducing element provides a fluid-mechanical decoupling between the outer region of the casing of the volume-reducing element and the inner region of the casing of said volume-reducing element above the distributor bottom.

The volume-reducing element can preferably be secured by means of openings in the distributor bottom, which, for example, are provided for spray nozzles.

According to a further preferred embodiment of the product container, particularly favorable characteristics for the construction of the fluidized bed above the distributor bottom, can be implemented in that the distributor bottom has namely an incident-flow element, which is mounted on the distributor bottom on that side of the distributor bottom oriented toward the container opening. This ensures that the incoming gas for forming the fluidized bed does not flow directly into the space above the distributor bottom but indirectly after interaction with the incident-flow element and particularly with the bottom side thereof and the bottom. In this manner, a uniform, homogenous gas distribution can be achieved across the distributor bottom of the fluidized bed.

The incident-flow element is designed for incident flow from a side of the distributor bottom oriented away from the container opening. The incident flow can occur by means of gas supplied through the distributor bottom.

A particularly advantageous embodiment of the product container according to the invention then results if the volume-reducing element encloses the incident-flow element in the state, where said incident-flow element is mounted to the distributor bottom. Particularly simple conditions then occur if the incident-flow element is designed similar in shape to the volume-reducing element and in particular having the same geometric shape as the volume-reducing element. By means of these measures, a particularly compact arrangement results in the interior of the product container and above the distributor bottom.

The incident-flow element can preferably be designed as a vertical, circular cone, preferably having a continuous casing and a bottom, wherein the bottom of the incident-flow element is further preferably mounted on the side of the distributor bottom oriented toward the container opening.

The product container according to the invention can be used in a particularly flexible manner if the volume-reducing element can be controlled with its effect, i.e. can be added when needed. Provision is correspondingly made in another preferred embodiment of the product container according to the invention for a lifting device to be arranged on the side of the distributor bottom oriented toward the product container opening, said lifting device being equipped to move the at least one volume-reducing element between at least a first position (A) and a second position (B). The volume-reducing element rests with the bottom thereof against the distributor bottom in the first position (A). In the second position (B), said volume-reducing element is in contrast spaced apart with the bottom thereof from the distributor bottom. In the second position (B), the spacing apart of the volume-reducing element from the distributor bottom can particularly occur in the direction of the product container opening and if need be beyond said opening. As a result, the space above the distributor bottom necessary for the treatment is particularly effectively freed from the restrictive effect of the volume-reducing element.

The use of the product container according to the invention occurs very flexibly if a plurality of volume-reducing elements is formed, which particularly have a different size and/or in each case are used singularly or in combination with one another. Depending on the necessary product volume, different volume-reducing elements are correspondingly used either individually or in combination, for example also in a form where they are partially nested in one another, wherein respectively the outermost volume-reducing element that is mounted to the distributor bottom defines the actually effective volume reduction of the product container.

Particularly simple conditions occur if two volume-reducing elements are formed and provided so as to be nested in one another. Two or three effective product container volumes then result, for example having a maximum reduction, if a larger volume-reducing element is mounted to the distributor bottom together with the smaller volume-reducing element that is nested in with the larger volume-reducing element. A maximum product container volume results if none of the volume-reducing elements is mounted to the distributor bottom. An effective product container volume which lies therebetween then results if the smaller of the two volume-reducing elements is mounted to the distributor bottom; the larger of the two volume-reducing elements is however spaced apart from the distributor bottom and from the smaller volume-reducing element mounted there. To this end, it is advantageous if the volume-reducing elements are nested in one another, provided they are located in their first positions (A) and are separated from one another if the smaller of the volume-reducing elements is located in the first position (A) and the larger of the volume-reducing elements is located in the second position (B).

In another embodiment of the product container according to the invention, a volume-reducing element assumes or circumscribes or comprises with the casing thereof a volume, or encloses said volume, which is approximately 38% of the free volume of the product container between the distributor bottom and the product container opening. A volume-reducing element preferably assumes or circumscribes or comprises with the casing thereof a volume, or encloses said volume, which is approximately 69% of the free volume of the product container between the distributor bottom and the product container opening.

By means of a volume-reducing element, the free volume of the product container between the distributor bottom and the product container opening can be reduced in a range of approximately 38% to approximately 69%.

These proportions are not mandatory. Other expedient proportions can be found by means of the configuration of the geometric boundary conditions of the respective volume-reducing element. A plurality of volume-reducing elements can also be used in combination with one another.

According to another aspect, the present invention relates to a fluidized bed installation as such. Said fluidized bed installation comprises a product container according to the invention and a process container. In so doing, the process container adjoins, with a process container opening, the product container opening of the product container or can adjoin the same.

BRIEF DESCRIPTION OF THE DRAWINGS

Embodiments of the invention are described in detail with reference to the attached drawings.

DETAILED DESCRIPTION

Exemplary embodiments of the invention are described below in detail with reference to FIGS. 1 to 8.

Figure 9:
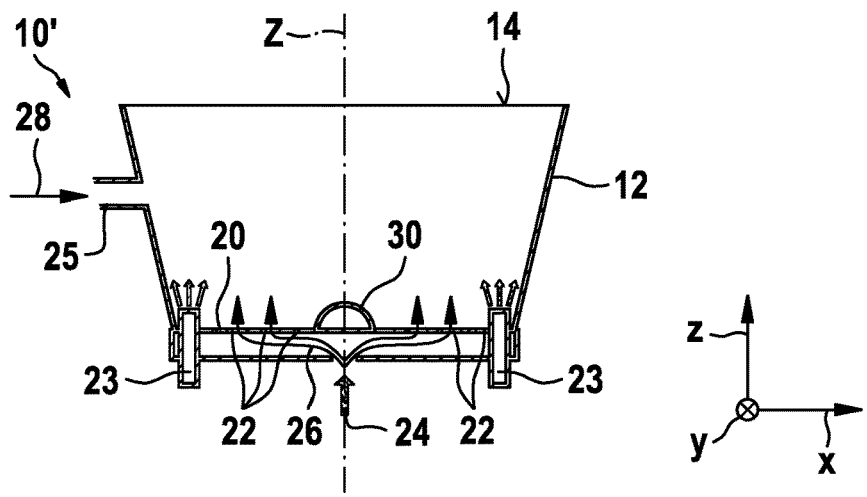
FIGS. 9 and 10 show a product container respectively a fluidized bed installation, which form a starting point for the present invention.
Figure 10:
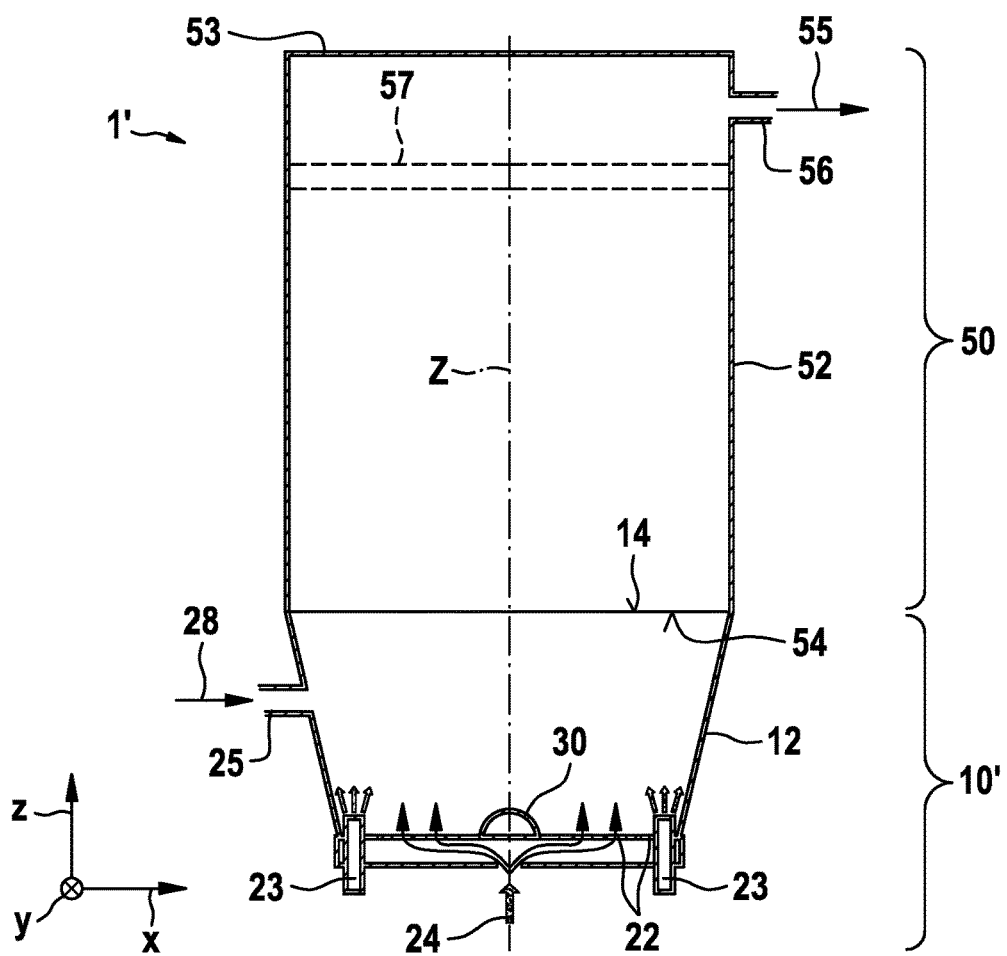

FIGS. 9 and 10 describe a product container 10' for a fluidized bed installation 1' as well as a fluidized bed installation 1' itself, from which the inventors have started during the development of the inventive concept.

The same and equivalent elements and components as well as elements and components which act the same or equivalently are denoted with the same reference signs. The detailed description of the denoted elements and components is not reproduced in each case of their occurrence. The features depicted and further characteristics can be isolated from one another in any form and arbitrarily combined with one another without departing from the essence of the invention.

Figure 1:
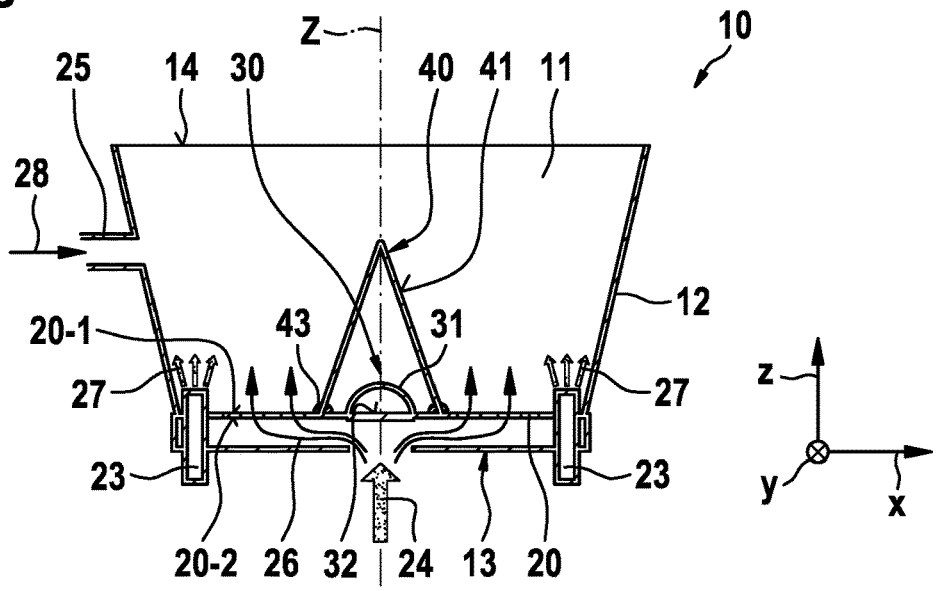
FIG. 1 is a lateral cross-sectional view of a first embodiment of the inventive product container for a fluidized bed installation.

FIG. 1 shows an embodiment of an inventive product container 10 for a fluidized bed installation 100 in a schematic and sectional lateral view.

The product container 10 is formed by a product container wall 12 and a product container bottom 13. The product container 10 of the embodiment pursuant to FIG. 1 is designed rotationally symmetrical substantially to an axis Z as symmetry axis and has a product container opening 14 on the side of the product container wall 12 opposite the product container bottom 13. The axis of symmetry Z extends here parallel to the spatial direction z.

The product container bottom 13 has an opening, which forms an air or gas feed 24 for forming the fluidized bed in the interior 11 of the product container 10. A distributor bottom 20, which has a base plate 21 and a plurality of apertures 22, is provided in the lower region of the interior 11 of the product container 10 and adjacent to the product container bottom 13 but spaced apart from the same. In this way, gas introduced via the air or gas feed 24, for example in the form of air, can leave the region between product container bottom 13 and distributor bottom 20 and penetrate into the space above the distributor bottom 20 in order to form the fluidized bed there in interaction with the present material, in particular with a bulk material.

In this embodiment, one or a plurality of nozzles 23, via which a treatment means 27 can be supplied into the interior 11 of the product container 10 above the distributor bottom 21, in particular by spraying in a mist or something similar, are designed for the treatment of the material in the fluidized bed.

The nozzles 23 can be varied with regard to the number, arrangement and orientation thereof. To this end, provision can be made for the nozzles, for example, to be capable of being arranged in a releasably mountable and orientable manner on the distributor bottom 21. This can, for example, also take place via one or a plurality of apertures 22 in the distributor bottom 21.

A feed 25—for example for solids or the like—is formed in the product container wall 12 above the distributor bottom 20 and below the product container opening 14. A material 28 to be treated, for example a solid, preferably in the form of a bulk material, can be introduced via the feed 25.

In a central region, an incident-flow element is arranged on the distributor bottom 21 on the side 20-1 oriented toward the product container opening 14. In the embodiment pursuant to FIG. 1, said incident-flow element has a hemispherical shape having a convex casing 31 in the form of a hemispherical surface and a planar bottom 32 in the form of a circular disc. The incident-flow element 30 is mounted to the bottom 32 in the form of the circular disc on the upper side, i.e. on the side 20-1 oriented toward the product container opening 14. In this way, the supplied gas 26 coming from the feed 24 during operation flows against the underside of the bottom 32 of the incident-flow element 30, interacts with the same and thereby to the side, i.e. radially deflected to the outside, and spreads in the space between product container bottom 13 and distributor bottom 20 before the gas 26 then enters through the apertures 22 in the base plate 21 of the distributor bottom 20 into the interior 11 of the product container 10 above the distributor bottom 20.

According to the invention, a volume-reducing element 40 is provided in addition to or alternatively to the incident-flow element. Said volume-reducing element is likewise located on the side 20-1 of the distributor bottom 20 oriented toward the product container opening 14 and is configured having a casing 41 and a bottom 42. The casing 41 is here the casing of a vertical, circular cone. The bottom 42 can be a continuous circular disc, which can also function as an incident-flow element. Alternatively, the bottom 42 can be formed as a circular disc ring or also, only formed from the lower edge of the casing.

Provision is made for a seal 43 in the region of this lower edge of the casing or in the transition between bottom 42 and casing 41, which seal completely runs around the edge between casing 41 and bottom 42 or the lower edge of the casing 41. By means of the seal 43, the underside of the volume-reducing element 40 or—if the volume-reducing element 40 is open below—the interior of the volume-reducing element 40 is fluid mechanically decoupled from the interior 11 of the product container 10 above the distributor bottom 20.

In the embodiment pursuant to FIG. 1, the volume-reducing element 40 is slipped over the incident-flow element 30. That means that incident-flow element 30 and volume-reducing element 40 are nested in one another. In this case of FIG. 1, the incident-flow element 30 as well as the volume-reducing element 40 is constructed rotationally symmetrical to the axis of symmetry Z.

Due to the sealing with respect to the underside or respectively the interior of the volume-reducing element 40 by means of the seal 43, the effective volume of the interior 11 of the pressure container 10 above the distributor bottom 20 is reduced by the volume of the interior of the volume-reducing element 40; thus enabling the inventive product container 10 to be used for two different product volumes, namely with the original product container volume above the distributor bottom 20 and with a volume reduced by the volume of the interior of the volume-reducing element 40.

Figure 2:
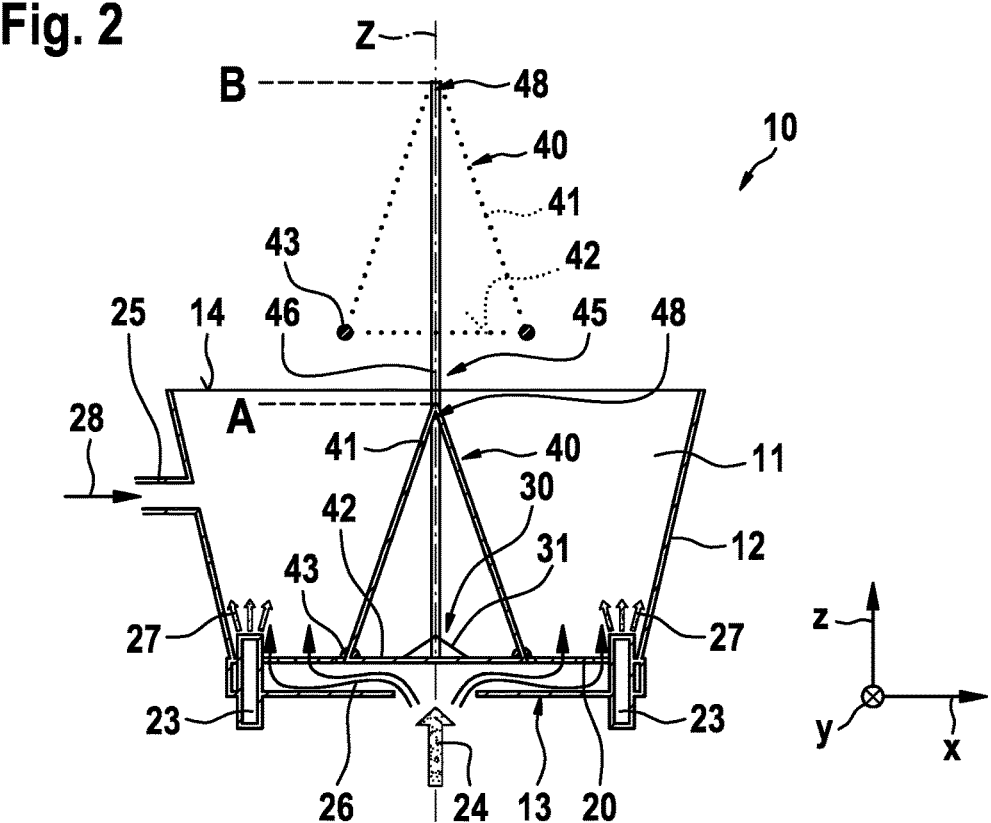
FIG. 2 shows another embodiment of the inventive product container for a fluidized bed installation, in which a lifting device for the volume-reducing element is provided.

FIG. 2 shows another embodiment of the product container 10 according to the invention. This embodiment is similarly constructed as the embodiment pursuant to FIG. 1, has however the following differences.

On the one hand, the incident-flow element is not formed here as a hemisphere but has the form of a vertical, circular cone or cone of revolution.

Furthermore, provision is made for a volume-reducing element 40 having casing 41 and bottom 42 as well as a circumferential seal 43 in the transition between casing 41 and bottom 42, said volume-reducing element being enlarged with respect to the volume-reducing element 40 from the embodiment pursuant to FIG. 1.

In addition, a movement and lifting device 45 is formed on which the volume-reducing element 40 is held on the tip thereof with a holder 47. By means of the movement and lifting device 45, the volume-reducing element 40 can be lifted off from a position (A) at which the volume-reducing element rests with the bottom 42 thereof on the side 20-1 of the distributor bottom 20 oriented toward the product container opening 14 and transferred to a position (B) whereat the volume-reducing element 40 is spaced apart from the side 20-1 of the distributor body 20 oriented toward the product container opening 14.

By the volume-reducing element assuming the position (B), an enlarged effective volume is provided for the operation of the underlying fluidized bed installation 1 in the interior 11 of the product container 10 above the distributor bottom 20 because, in this case, a fluid mechanical decoupling to the interior of the volume-reducing element 40 is no longer present.

In FIG. 2, the spaced position (B) for the volume-reducing element 40 is schematically depicted in a dotted form. The movement and lifting device 45 is substantially formed here by a telescopic device 46, with which the holder 48 can be lifted from the position (A) to the position (B) and as a result thereof also the entire volume-reducing element 40.

The inventive product container 10 can be used for two different product volumes as a result of the reciprocating movement of the volume-reducing element 40 between the lowered first position (A) and the separated or spaced second position (B). A still higher flexibility with different product volumes for the inventive product container 10 can accordingly be achieved by providing a plurality of movable volume-reducing elements 40.

Figure 3:
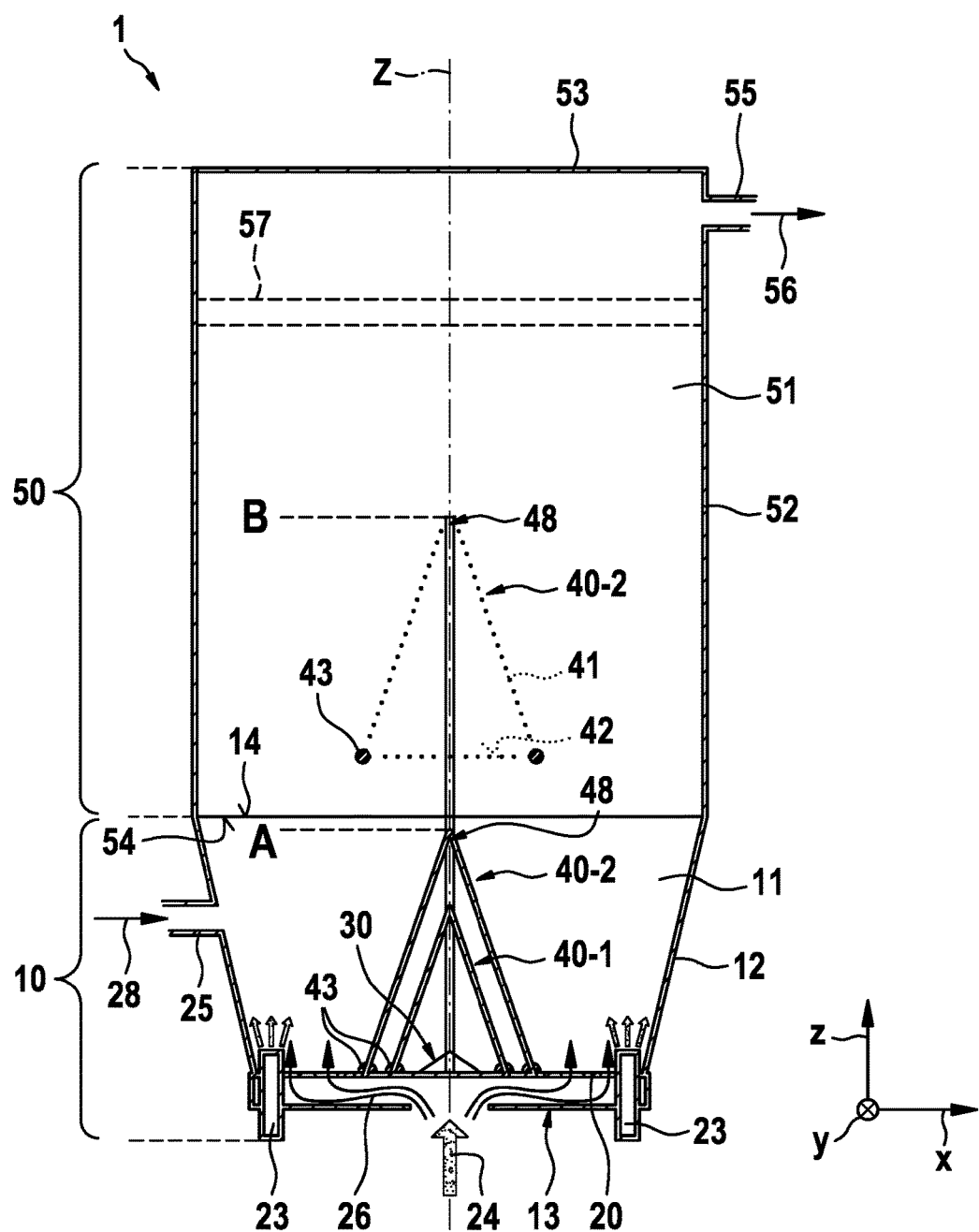
FIG. 3 shows an embodiment of the inventive fluidized bed installation comprising an inventive product container and a process container in a lateral cross-sectional view.

In a schematic and sectional lateral view, FIG. 3 shows an embodiment of a fluidized bed installation 1 according to the invention, in which an embodiment of the product container 10 according to the invention is used which is similarly constructed as the product container 10 according to the invention pursuant to FIG. 2. In contrast thereto, the inventive product container 10 pursuant to FIG. 3 has however two volume-reducing elements 40, which are denoted here with the reference numbers 40-1 and 40-2, in addition to the incident-flow element 30. The first and second volume-reducing elements 40-1 and 40-2 are nested in one another in the depiction pursuant to FIG. 3 and have a similarity of shape and particularly rotational symmetry to the common axis of symmetry Z.

In the embodiment pursuant to FIG. 3, the second volume-reducing element 40-2 is designed having greater volume than that of the first volume-reducing element 40-1. The second volume-reducing element 40-2 surrounds the first volume-reducing element 40-1 if it is located in the first or lowered position (A). As a result, the interior 11 of the product container 10 above the distributor bottom 20 is maximally reduced in the effective volume thereof.

The dotted depiction shows the second volume-reducing element 40-2 in the raised or separate second position (B) in which the first volume-reducing element 40-1, which remains in the position (A), is released and provides an effective volume in the interior 11 of the product container 10 above the distributor bottom 20, said volume being enlarged with respect to that when using the second volume-reducing element 40-2. The enlargement of the effective volume results as the difference of the volumes of the first and the second volume-reducing elements 40-1 and 40-2.

The process container 40 is mounted above the product container 10, wherein the product container opening 14 and the process container opening 54 are designed such that they can be flanged on one another; and a substantially completely closed and continuous container for the fluidized bed installation 1 thereby results.

The process container 50 as such consists of a process container wall 52 and a process container roof 53. In the interior of the process container 50, a process filter 57 is arranged in the upper region. This completely traverses the interior 51 of the process container 50 in the transverse direction and is used to separate out and/or convert undesirable constituents of process gas in the interior 51 of the process container 50 before the process gas leaves the interior 51 of the process container 50 as exhaust gas 56 via the outlet 55.

Figure 4:
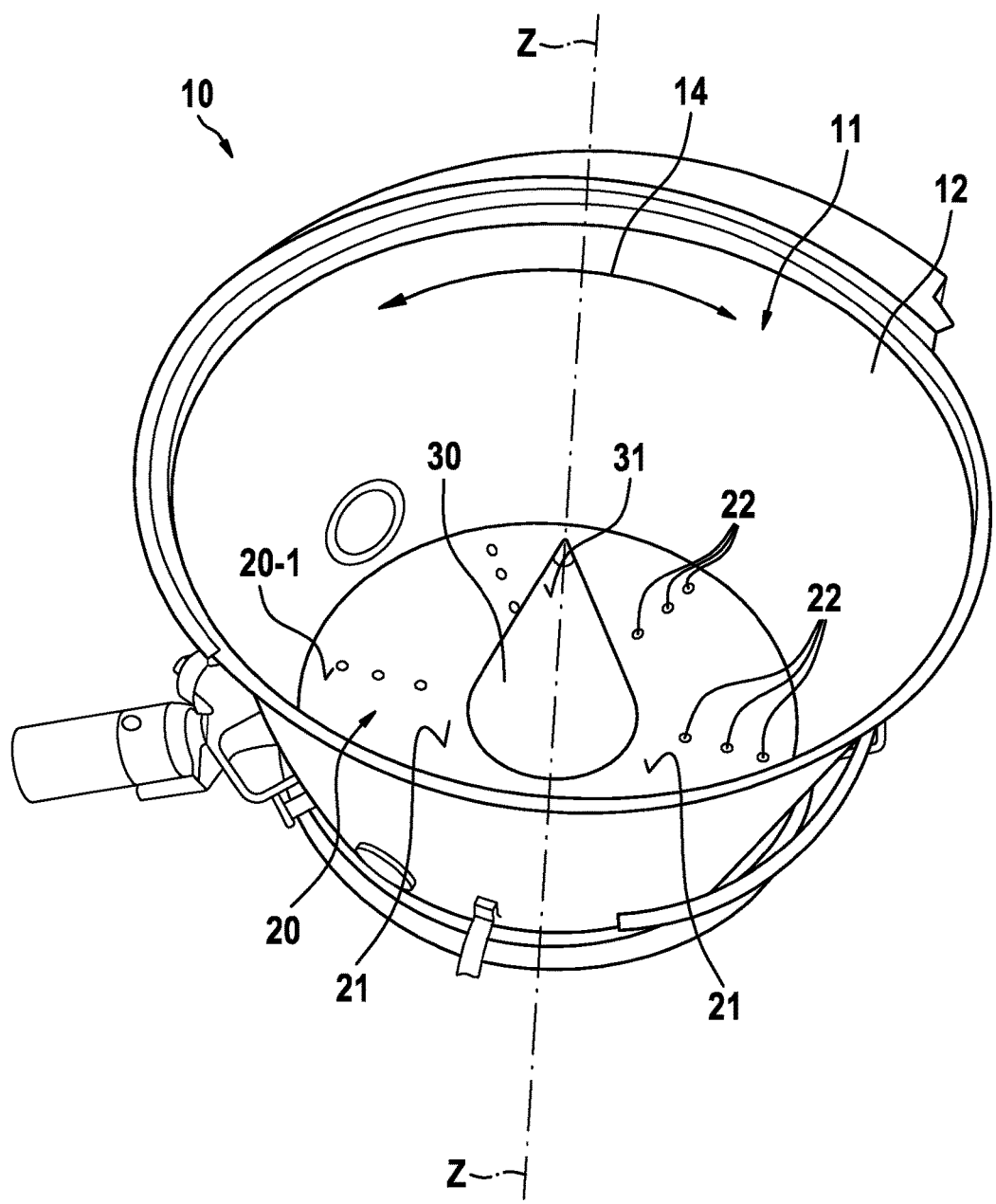
FIG. 4 shows another embodiment of the product container according to the invention in a perspective side view from above.

FIG. 4 shows a perspective top view of another embodiment of the product container 10 according to the invention. This embodiment corresponds approximately to the embodiments pursuant to FIGS. 1 to 3, as the case may be with removed or raised volume-reducing element 40. An incident-flow element 30 is then arranged in the interior 11 of the product container 10 according to the invention and lies on the side 20-1 of the distributor bottom 20, which comprises bottom plate 21 and apertures 22, oriented toward the product container opening 14. During operation, the incident flow element 30, which is present if applicable, or further volume-reducing elements 40 of smaller volume is surrounded by an outermost volume-reducing element 40. The volume-reducing element(s) is/are not depicted in FIG. 4. Via a holder 48, the volume-reducing element(s) can be transferred by means of a movement and lifting device 45 from a first or lowered position (A), which is not depicted in FIG. 4, to a second or raised position (B).

Figure 5:
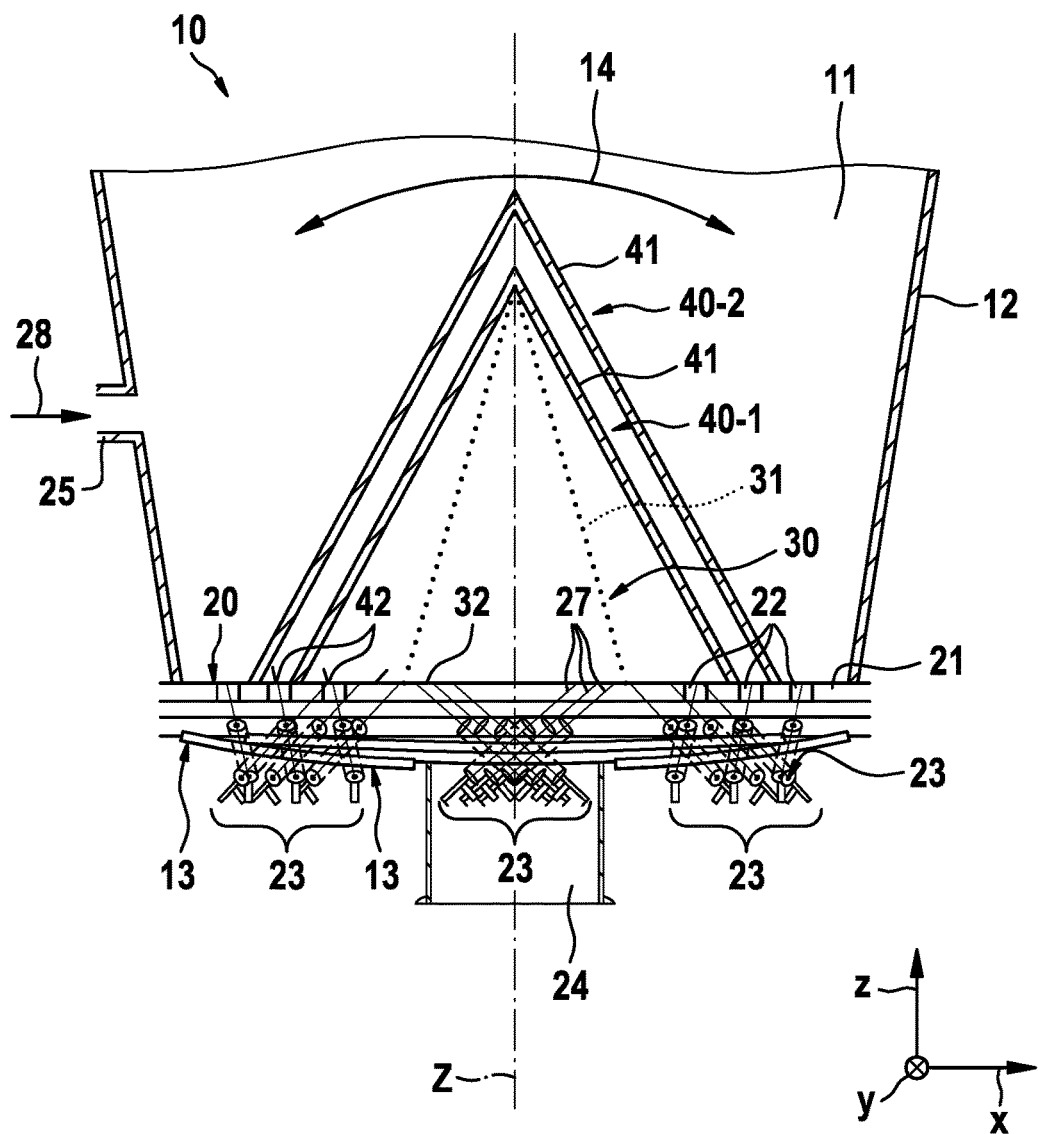
FIG. 5 shows an embodiment of the inventive product container having a plurality of volume-reducing elements in a lateral cross-sectional view.

FIG. 5 shows another embodiment of the product container 10 according to the invention in a schematic or sectional lateral view. In this embodiment, an incident-flow element 30 in the form of a vertical, circular cone as well as first and second volume-reducing elements 40-1 and 40-2 is depicted, said volume-reducing elements enclosing the incident-flow element 30 and being nested in one another.

By means of a plurality of nozzles 23, a treatment means 27, e.g. a fluid, can be sprayed across the apertures 22 in the bottom plate 21 of the distributor bottom 20.

Figure 6:
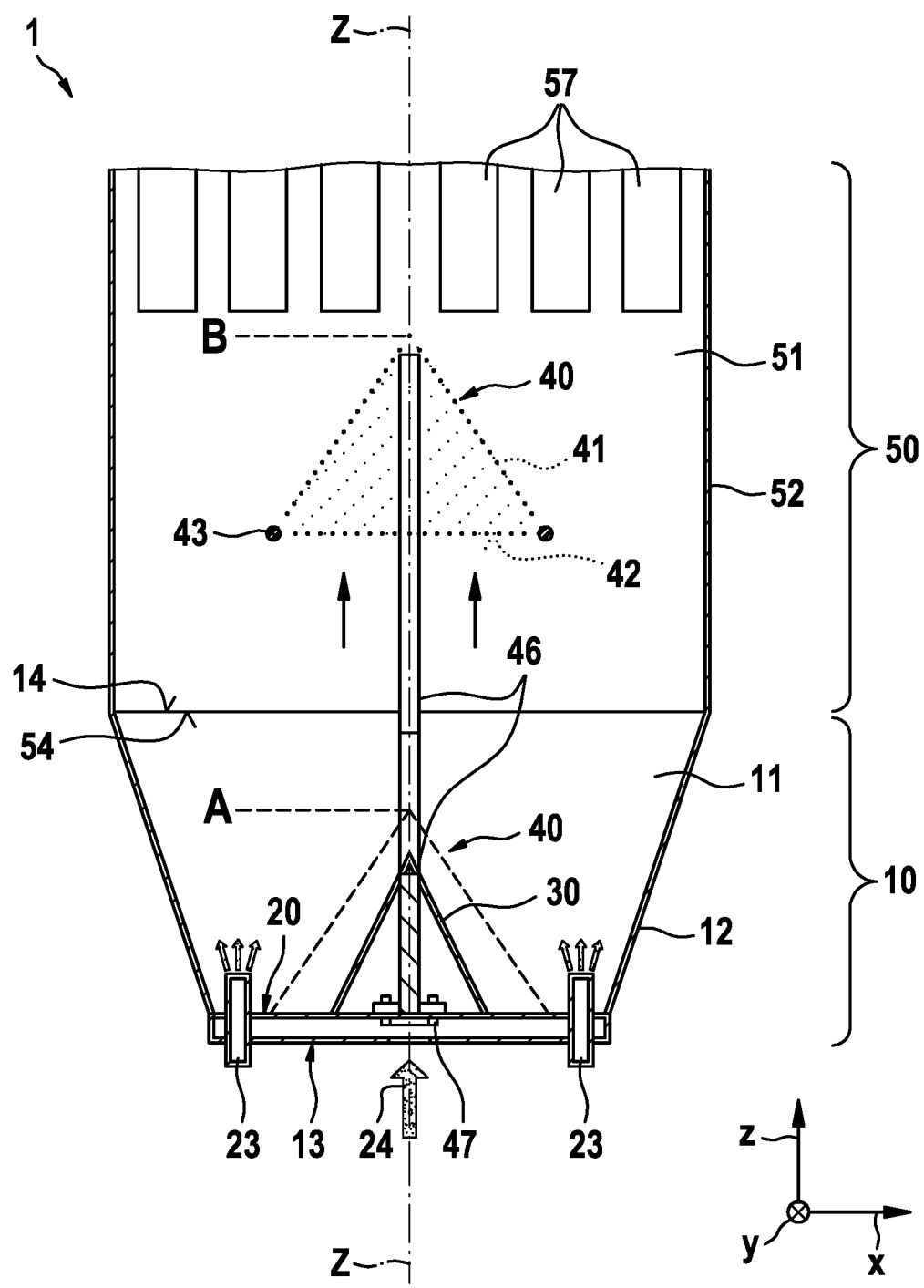
FIG. 6 shows another embodiment of the fluidized bed installation according to the invention in a lateral cross-sectional view.

In a schematic and sectional side view, FIG. 6 shows another embodiment of a fluidized bed installation 1 according to the invention, in which an embodiment of the product container 10 according to the invention is used, which approximately corresponds to the embodiment of FIG. 2.

The second raised or spaced position (B), which is achieved by means of the operation of the telescopic device 46 of the movement and lifting device 45 via coupling of the volume-reducing element 40 by means of the holder 48, is however depicted here for the volume-reducing element 40 comprising casing 41, bottom 42 and seal 43. The movement and lifting device 45 is in turn mounted on the distributor bottom 20 by means of an attachment 47 on the side 20-1 of the bottom plate 21 oriented toward the product container opening 14.

Figure 7:
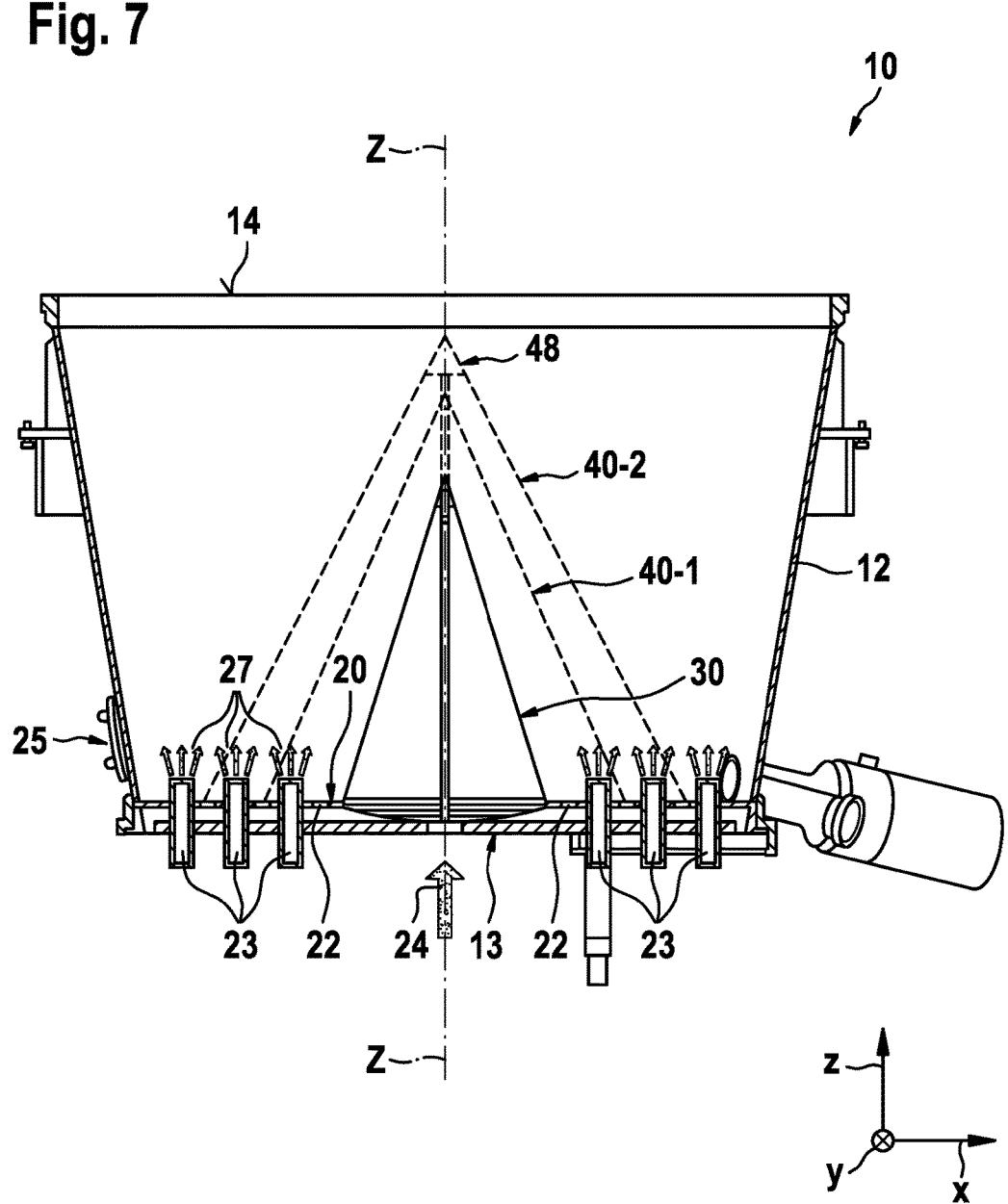
FIG. 7 shows an embodiment of the inventive product container of a fluidized bed installation which is comparable to the embodiment of FIG. 5.

FIG. 7 shows an arrangement for a product container 10 according to the invention which is comparable to the arrangement pursuant to FIG. 5. An incident-flow element 30 is explicitly depicted here in a lateral top view, whereas the first and second volume-reducing elements 40-1, 40-2 are only schematically indicated by means of dashed lines.

Figure 8:
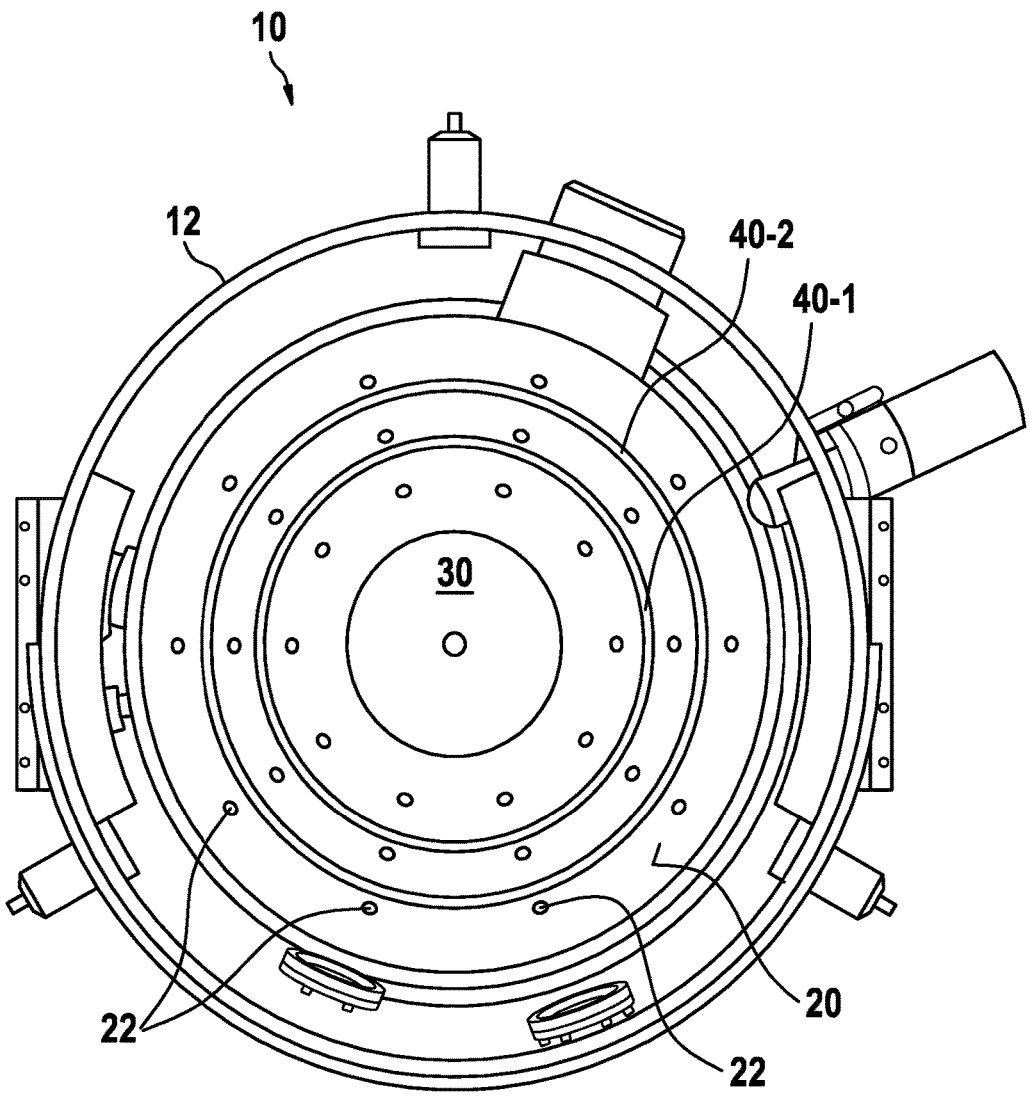
FIG. 8 shows a top view of the product container from FIG. 7.

FIG. 8 shows a top view from above of the embodiment of FIG. 7. The incident-flow element 30 in the form of a vertical, circular cone can again be seen. The contact regions of the first and second volume-reducing elements 40-1 and 40-2, which would be implemented by means of the respective seal 43, are indicated.

The attachment of the volume-reducing element 40-1 and 40-2 can alternatively take place via the opening 22 of the nozzles 23 in the distributor bottom 20.

FIGS. 9 and 10 show embodiments for a product container 10' and for a fluidized be installation 1' without use of the volume-reducing element 40, 40-1 and 40-2 provided according to the invention. These arrangements therefore represent the starting point of the measures according to the invention.

These and further aspects of the present invention and the advantages thereof are further enhanced using the following explanations:

Fluidized bed installations, e.g. for drying, granulating or coating powdery substances have a corresponding installation size and fill volume depending on the automated design thereof. Depending on the designed fill volume, the intended process is laid down for a minimum and a maximum quantity of product. A minimum amount of product is specified so that the powdery product from the air stream coming through the distributor bottom sufficiently moves, can be fluidized. In the case of granulation, a minimum quantity of product via the spray nozzles built into the bottom is absolutely required, so that the sprayed binder substance is in contact with the product. The maximum fill volume is as a rule given by the upper edge of the product container.

FIG. 4 shows, e.g., a product container 10 for a fluidized bed installation of a certain overall size, the distributor bottom 20, here as an air distributor bottom, 18 spray nozzles 23 as well as a conical incident-flow element 30 in the middle of the distributor bottom 20. In order to design fluidized bed installations more flexibly in their area of application, provision is made according to the invention for one or a plurality of volume-reducing elements 40, 40-1, 40-2 to be designed, e.g., in the form of an enlarged inner cone, as this is shown, e.g., in FIG. 5. These volume-reducing elements 40-1, 40-2 as inner cone are installed so as to slip over the incident-flow element as inner cone. The maximum height of the additional inner cone is delimited as a rule by the height of the product container 10, if the pivoting-out function is to be maintained for the product container. The maximum diameter of the additional inner cone, i.e. of the respective volume-reducing elements 40, 40-1, 40-2 must be configured such that the distributor bottom 20 is not completely covered and air can always flow through the distributor bottom 20 into the interior 11 of the product container 10. The maximum diameter is preferably delimited by the outermost row of nozzles. These should not be covered. If spray nozzles 23 in the distributor bottom 20 are covered by the new additional inner cone, said spray nozzles can then be removed. The attachment of the respective volume-reducing element 40, 40-1, 40-2 as inner cone can take place by means of the openings of the apertures 23 in the distributor bottom 20 which have become free. This can, e.g., be implemented by using a type of extended nozzle dummy with thread in the front part. To this end, an attachment thread must be provided in the cone only at the same angle of penetration.

The following extensions of the inventive concept are conceivable:

In addition, a respective volume-reducing element 40, 40-1, 40-2 as cone can be driven by means of an automated lifting mechanism 45, e.g., telescopic cylinder 46, in the center, upwards up to the process filter 57 when the fluidized bed installation 100 is closed and the operation is ongoing. Thus, the capacity can be variably enlarged or reduced when the installation is closed. After the product has been emptied and cleaning has taken place, the cylinder 46 can again be driven into the original position thereof and the installation 100 can again be opened.

According to the invention, the following disadvantages are inter alia prevented:

Upon request of different production sizes, the entire previous product container 10' has up until now been designed and constructed in different sizes. Because of this, high investment costs result. Furthermore, the previous product container 10' is not easy to change. A conversion can only be implemented with additional lifting technology due to the size of the installations and takes a plurality of hours to days. Alternatively, an additional installation having larger or smaller production capacity is built for different production quantities.

In the present day pharmaceutical production, the requested production quantity of the producers decreases more and more. Whereas 10 years ago buyers or respectively distributors of pharmaceutical products still ordered high quantities of packagings from the producers, the average requested quantity today has significantly declined with a tendency to continue to fall. This decline in the production quantities places increased demands on the flexibility of the production facilities.

The flexibility of already existing as well as new fluidized bed installations 100 is improved by the present invention. Fluidized bed installations 100 have a significantly larger area of application than before due to the now variable volume. Depending on request, different quantities can easily be produced in one and the same installation 100.

An aspect of the present invention relates to the provision of one or a plurality of volume-reducing elements 40, 40-1, 40-2, e.g., in each case as an additional inner cone. This can be produced in different sizes and thus enables a variable volume of the product container 10 in the fluidized bed installation 100.

The conversion with the introduction of the volume-reducing element(s) 40, 40-1, 40-2 can take place by a single person. By pivoting out the product container 10, a volume-reducing element 40, 40-1, 40-2 can be placed as the inner cone, e.g., over the existing incident-flow element 30. Only covered spray nozzles 23 must, if need be, be removed. Such a conversion can be implemented in a few minutes so that at most a short interruption of production is necessary.

For the expansion of production capacities from the pilot scale (10-50 kg per batch), a scale-up to the production scale (>50 kg per batch) within a fluidized bed installation 100 can be carried out using the different volume-reducing elements 40, 40-1, 40-2.

For example, the working volume of the product container 10 can be reduced from originally 1.6 $m^3$ to 1 $m^3$ with an additional first volume-reducing element 40-1 and to 0.5 $m^3$ with an additional second volume-reducing element 40-2.

The invention claimed is:

1. A product container for a fluidized bed installation (1), the product container comprising:
   a product container wall (12),
   a product container bottom (13),
   a product container opening (14) opposite the product container bottom (13),
   a distributor bottom (20) between the product container bottom (13) and the product container opening (14), and at least one volume-reducing element (40) which is configured to be releasably attached to the distributor bottom (20), on a side (20-1) of the distributor bottom (20) oriented toward the product container opening (14), and by which a free volume of the product container (10) between the distributor bottom (20) and the product container opening (14) is reduced, wherein the volume-reducing element (40) has a bottom region (42) and a casing (41), wherein the bottom region (42) of the volume-reducing element (40) is configured to be releasably attached to the distributor bottom (20), and wherein the volume-reducing element (40) has a circumferential seal (43) in a transition between the casing (41) and the bottom region (42), with which seal the volume-reducing element (40) is configured to be arranged on the distributor bottom (20).

2. The product container (10) according to claim 1, wherein the volume-reducing element is conical.

3. A product container for a fluidized bed installation (1), the product container comprising:
   a product container wall (12),
   a product container bottom (13),
   a product container opening (14) opposite the product container bottom (13),
   a distributor bottom (20) between the product container bottom (13) and the product container opening (14), and
   at least one volume-reducing element (40) which is configured to be releasably attached to the distributor bottom (20), on a side (20-1) of the distributor bottom (20) oriented toward the product container opening (14), and by which a free volume of the product container (10) between the distributor bottom (20) and the product container opening (14) is reduced, wherein the distributor bottom (20) has an incident-flow element (30), which is mounted to the distributor bottom (20) on a side (20-1) of the distributor bottom (20) oriented toward the container opening (14).

4. The product container (10) according to claim 3, wherein the volume-reducing element (40) encloses the incident-flow element (30) in a mounted state on the distributor bottom (20) and/or
wherein the incident-flow element (30) has the same geometric shape as the volume-reducing element (40).

5. A product container for a fluidized bed installation (1), the product container comprising:
   a product container wall (12),
   a product container bottom (13),
   a product container opening (14) opposite the product container bottom (13),
   a distributor bottom (20) between the product container bottom (13) and the product container opening (14), and
   at least one volume-reducing element (40) which is configured to be releasably attached to the distributor bottom (20), on a side (20-1) of the distributor bottom (20) oriented toward the product container opening (14), and by which a free volume of the product container (10) between the distributor bottom (20) and the product container opening (14) is reduced, wherein a lifting device (50) is constructed on a side (20-1) of the distributor bottom (20) oriented toward the product container opening (14), said lifting device being equipped to move the at least one volume-reducing element (40) between at least a first position (A) and a second position (B), and
wherein the volume-reducing element (40) rests with a bottom (42) thereof against the distributor bottom (20) in the first position (A) and with the bottom (42) thereof spaced apart from the distributor bottom (20) in the second position (B).

6. The product container (10) according to claim 1, comprising a plurality of volume-reducing elements (40-1, 40-2) having different sizes.

7. The product container (10) according to claim 6, wherein two of the plurality of volume-reducing elements (40-1, 40-2) are constructed and nested in one another.

8. The product container (10) according to claim 1, wherein a free volume of the product container (10) between the distributor bottom (20) and the product container opening (14) is reduced by the volume-reducing element (40, 40-1, 40-2) in a range of approximately 38% to approximately 69%.

9. A fluidized bed installation (1), comprising:
   a product container (10) according to claim 1 and
   a process container (50) which, with a process container opening (54), adjoins or is configured to adjoin the product container opening (14) of the product container (10).

10. The product container (10) according to claim 1, wherein the volume-reducing element has the shape of a vertical, circular cone.

11. The product container (10) according to claim 3, wherein the volume-reducing element is conical.

12. The product container (10) according to claim 5, wherein the volume-reducing element is conical.

13. The product container (10) according to claim 3, comprising a plurality of volume-reducing elements (40-1, 40-2) having different sizes, and two of the plurality of volume-reducing elements (40-1, 40-2) are constructed and nested in one another.

14. The product container (10) according to claim 3, wherein a free volume of the product container (10) between the distributor bottom (20) and the product container opening (14) is reduced by the volume-reducing element (40, 40-1, 40-2) in a range of approximately 38% to approximately 69%.

15. A fluidized bed installation (1), comprising:
   a product container (10) according to claim 3 and
   a process container (50) which, with a process container opening (54), adjoins or is configured to adjoin the product container opening (14) of the product container (10).

16. The product container (10) according to claim 5, comprising a plurality of volume-reducing elements (40-1, 40-2) having different sizes, and two of the plurality of volume-reducing elements (40-1, 40-2) are constructed and nested in one another.

17. The product container (10) according to claim 5, wherein a free volume of the product container (10) between the distributor bottom (20) and the product container opening (14) is reduced by the volume-reducing element (40, 40-1, 40-2) in a range of approximately 38% to approximately 69%.

18. A fluidized bed installation (1), comprising:
   a product container (10) according to claim 5 and
   a process container (50) which, with a process container opening (54), adjoins or is configured to adjoin the product container opening (14) of the product container (10).

19. The product container (10) according to claim 3, wherein the volume-reducing element has the shape of a vertical, circular cone.

20. The product container (10) according to claim 5, wherein the volume-reducing element has the shape of a vertical, circular cone.

\* \* \* \* \*